UNITED STATES PATENT OFFICE.

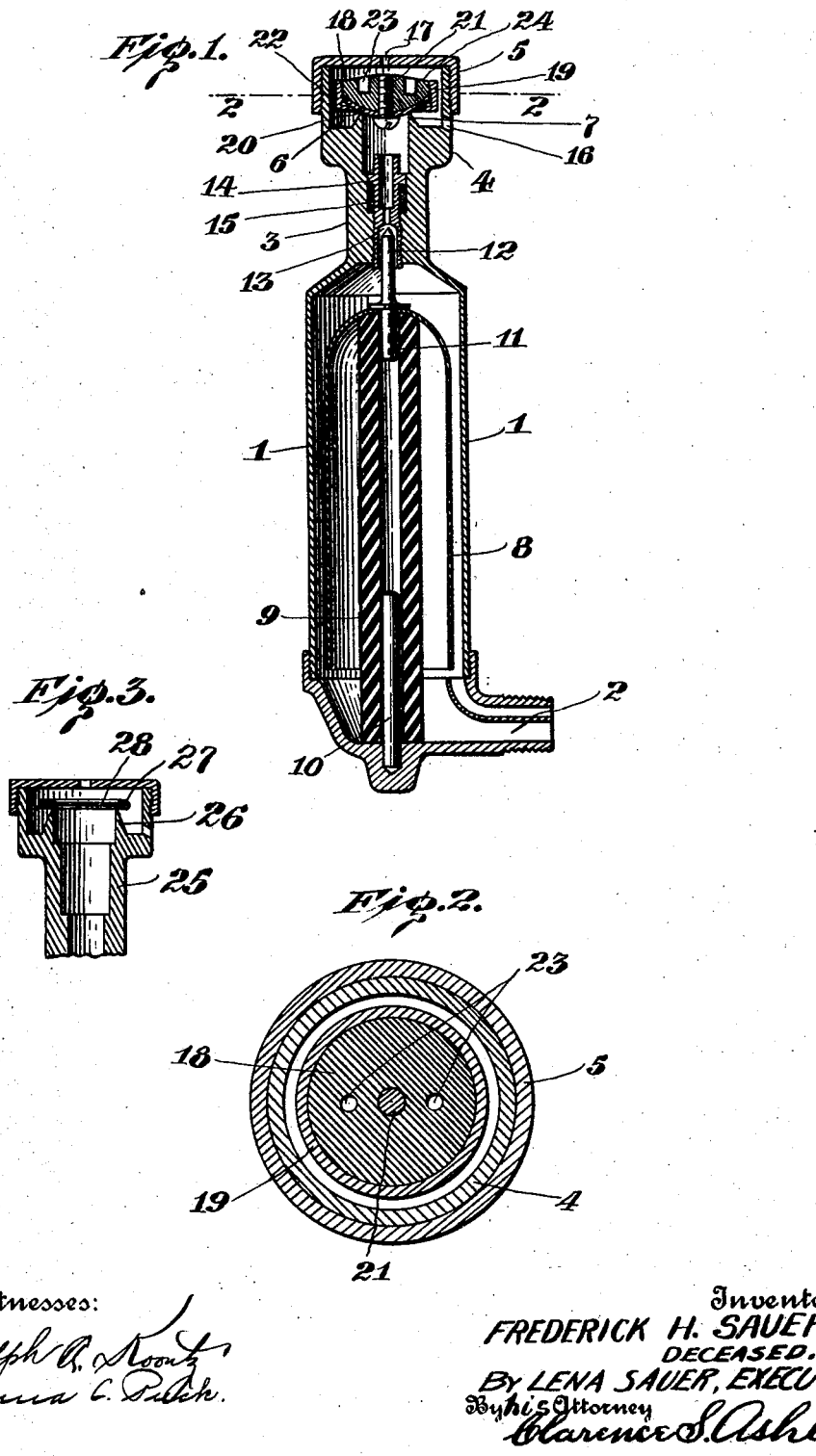

FREDERICK H. SAUER, DECEASED, LATE OF NEW YORK, N. Y., BY LENA SAUER, EXECUTRIX, OF NEW YORK, N. Y.

AIR-VALVE.

1,186,845.   Specification of Letters Patent.   Patented June 13, 1916.

Application filed May 26, 1915. Serial No. 30,657.

*To all whom it may concern:*

Be it known that FREDERICK H. SAUER, deceased, who was a citizen of the United States and a resident of New York city, in the county of New York and State of New York, has invented certain new and useful Improvements in Air-Valves, of which the following is a specification.

This invention relates to air valves for radiators and the present improvement has particular reference to the character and arrangement of the vacuum valves employed with these devices whereby upon shutting off steam or ceasing its generation, thus allowing the air valve to open to the atmosphere, the vacuum valve closes and prevents the intake of air from the atmosphere to satisfy the vacuum thus formed within the valve and its connecting steam passages. Difficulty has hitherto been experienced in securing and maintaining the practical operation of the vacuum valves now in use, and the improved vacuum valve is especially devised for the purpose of affording efficient and enduring service.

To this end the improved vacuum valve consists of a circular valve body preferably of light weight material, which may be aluminum, having a convex face over which is placed a disk of flexible or compressible packing material, said valve body being screwed into a ring having an inward flange which engages within the peripheral edge of the packing disk to bind it tightly to said valve body, causing it to assume the surface contour thereof. Said vacuum valve, thus constituted, is disposed within the neck of the air valve, to engage an annular edge seat therein, to effectively close said valve under the suction induced by the creation of a partial vacuum therein.

The general character of the air valve with which the improved vacuum valve is employed may be of generally known construction.

In the drawing: Figure 1 is a vertical sectional view of an air valve and Fig. 2 is a horizontal section enlarged on the line 2—2 of Fig. 1. Fig. 3 is a modification.

The air valve illustrated herein comprises a cylindrical casing 1 having a lower inlet portion 2, for connection with a radiator, and having an upper neck portion 3 with an expanded extremity 4, externally threaded, to receive a threaded cap 5. Said expanded extremity 4 forms a chamber 6 for the vacuum valve, and is provided with a valve seat comprising an interiorly projecting, annular, diminishing wall 7, having a circular edge in a horizontal place.

The casing 1 contains a float 8 borne upon a stem 9 of expansible material, which has axial guides 10, 11 mounted respectively in the valve portion 2 and the float 8, the guide 11 continuing above the float into a needle valve 12 which is adapted to control a constricted valve orifice 13 in the neck 3. Said orifice 13 may be provided in a tubular member 14 fitted within neck 3 and having packing 15 to effect a steam and air tight joint. Escape from the chamber 6 may be through a hole 16 in wall 4, also through an orifice 17 in cap 5.

The vacuum valve which is operative within chamber 6, may consist of a valve body 18 which is preferably of light weight material, and may be of aluminum, to be easily displaceable for the passage of air upon breaking the vacuum seal. Said body is circular and threaded about its periphery whereby it may be screwed into a ring 19 that is provided with an internal thread. The forward surface of body 18 is of convex contour and provided with a disk 20, of compressible material which may be elastic composition, fiber or other suitable packing, said disk being screwed to said body as by a central screw 21. The ring 19 has an internal flange 22 forming a clamp to bind the peripheral portion of disk 20 against the body 18 when the latter has been screwed tightly within ring 19, to assure a smooth valve surface and the efficiency of the vacuum valve is measured by the taut character of this clamped connection. The body 18 may be provided with key holes 23 in its rear surface 24 to facilitate the operation of screwing it within ring 19. Said rear surface 24 may be of convex or angular form to prevent closing the orifice 17 in the cap when the air is passing off.

In practice the vacuum valve is freely contained within chamber 6, and is automatic in its operation. Thus with steam filling the radiator the valve 12 will be seated as is usual, and consequently the vacuum valve at this time performs no function, merely resting upon its seat 7. But upon condensation of the steam, followed by the contraction of stem 9 and withdrawal of valve 12 from orifice 13, the resulting partial vacuum within the valve casing will at once pull the vacuum valve to its seat and form a seal preventing the entry of atmospheric air to the air valve. Upon again supplying steam to the radiator the vacuum seal will be broken for the escape, until the closing of the needle valve, of any air that may have become pocketed. In the modification shown in Fig. 3, the neck portion 25 has loosely supported upon its annular diminishing wall 26 a disk valve which is composed of a folded ring or annulus 27 within which is clamped a thin circular piece 28 of suitable flexible sheet material which may be rubber. Under the influence of suction said flexible disk is drawn into close contact with its seat upon the wall 26 thereby preventing the inflow of atmospheric air.

What is claimed is:

The combination in an air valve of a vacuum valve for use with air valves, the same comprising a ring having an internal flange, a valve body of relatively light weight material adjustably screwed within said ring, said body having a valve surface of convex contour, a disk of compressible material superimposed upon said valve surface, and central connecting means between said disk and body, said disk being clamped at points anterior to its perimeter between said body and ring flange, to distend said disk over the convex contour of said body.

In testimony whereof I have hereunto signed my name in the presence of two subscribing witnesses.

LENA SAUER,
*Executrix of Frederick H. Sauer, deceased.*

Witnesses:
FRED A. GEISSHARDT,
WM. E. NETT.